United States Patent
Sekizawa

(10) Patent No.: US 7,421,055 B2
(45) Date of Patent: Sep. 2, 2008

(54) SIGNAL PROCESSING APPARATUS AND SIGNAL PROCESSING METHOD

(75) Inventor: Toshiyuki Sekizawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 597 days.

(21) Appl. No.: 10/364,468

(22) Filed: Feb. 12, 2003

(65) Prior Publication Data

US 2003/0179841 A1 Sep. 25, 2003

(30) Foreign Application Priority Data

Mar. 19, 2002 (JP) ............................... 2002-077219

(51) Int. Cl.
*H04L 23/00* (2006.01)
*G06G 7/02* (2006.01)

(52) U.S. Cl. ...................... 375/377; 341/144

(58) Field of Classification Search ................. 375/224, 375/350, 377; 708/300, 819; 341/144
See application file for complete search history.

(56) References Cited

U.S. PATENT DOCUMENTS

| | | | | |
|---|---|---|---|---|
| 3,744,051 A | * | 7/1973 | Sanders et al. | 341/52 |
| 3,925,774 A | * | 12/1975 | Amlung | 340/553 |
| 4,047,221 A | * | 9/1977 | Yasuda et al. | 375/240.05 |
| 4,065,722 A | * | 12/1977 | Francis | 329/300 |
| 4,366,471 A | * | 12/1982 | Kasuga | 341/110 |
| 4,580,128 A | * | 4/1986 | Ogita et al. | 341/144 |
| 4,614,934 A | * | 9/1986 | Kobayashi et al. | 341/144 |
| 4,621,217 A | * | 11/1986 | Saxe et al. | 315/1 |
| 4,796,296 A | * | 1/1989 | Amada et al. | 379/406.06 |
| 4,818,996 A | * | 4/1989 | Kimura | 341/144 |
| 4,849,957 A | * | 7/1989 | Suzuki | 369/59.16 |
| 4,860,317 A | * | 8/1989 | Tomlinson | 375/285 |
| 4,989,190 A | * | 1/1991 | Kuroe et al. | 369/30.13 |
| 5,012,242 A | * | 4/1991 | Yoshio et al. | 341/131 |
| 5,138,601 A | * | 8/1992 | Shimizume | 369/59.21 |
| 5,450,081 A | * | 9/1995 | Kuhn et al. | 341/94 |
| 5,541,929 A | * | 7/1996 | Jokura | 370/337 |
| 6,718,355 B2 | * | 4/2004 | Felts et al. | 708/319 |
| 2002/0138531 A1 | * | 9/2002 | Felts et al. | 708/300 |
| 2003/0179841 A1 | * | 9/2003 | Sekizawa | 375/350 |

FOREIGN PATENT DOCUMENTS

| | | |
|---|---|---|
| JP | 1-108887 A | 4/1989 |
| JP | 1-292673 A | 11/1989 |
| JP | 2-105368 | 4/1990 |
| JP | 2-124622 A | 5/1990 |
| JP | 5-304474 A | 11/1993 |
| JP | 8-116339 | 5/1996 |

* cited by examiner

Primary Examiner—Jean B Corrielus
(74) Attorney, Agent, or Firm—Arent Fox LLP

(57) ABSTRACT

In order to output an analog signal from which unnecessary out-of-band noise components are appropriately removed in accordance with digital data to be reproduced, a reproduction frequency determination circuit and cutoff frequency selection circuit detect the frequency level of a reproduced signal associated with input digital data and switch an analog LPF to a filter of an appropriate cutoff frequency selected and determined based on the detection result, thereby appropriately removing unnecessary out-of-band noise components from an analog audio signal obtained from the digital data using the filter having the cutoff frequency according to the frequency level of a reproduced signal obtained by reproducing the digital data.

17 Claims, 15 Drawing Sheets

| (SAMPLING FREQUENCY) ÷ (RUNLENGTH OF IDENTICAL POLARITIES) | DETERMINED REPRODUCTION FREQUENCY f | SELECTED CUTOFF FREQUENCY |
|---|---|---|
| SMALL | $f < f1$ | f1 |
| MIDDLE | $f1 < f < f2$ | f2 |
| LARGE | $f2 < f$ | f3 |

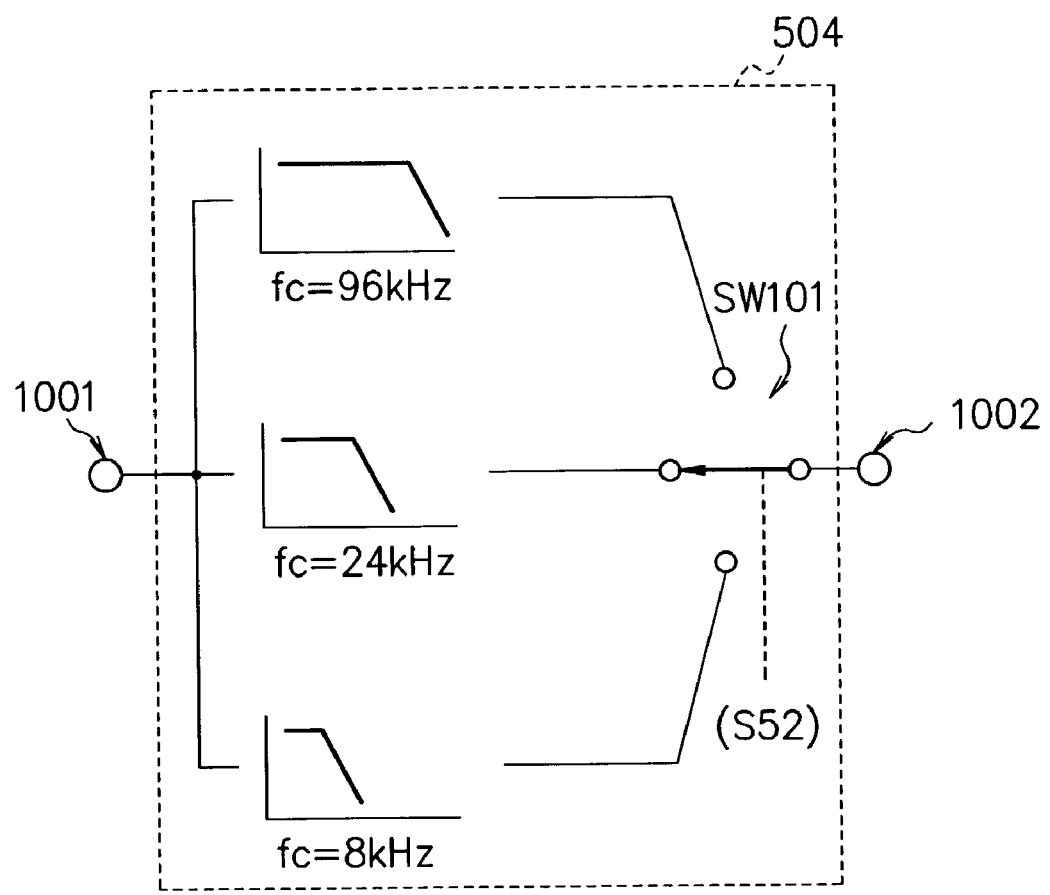
F I G. 10

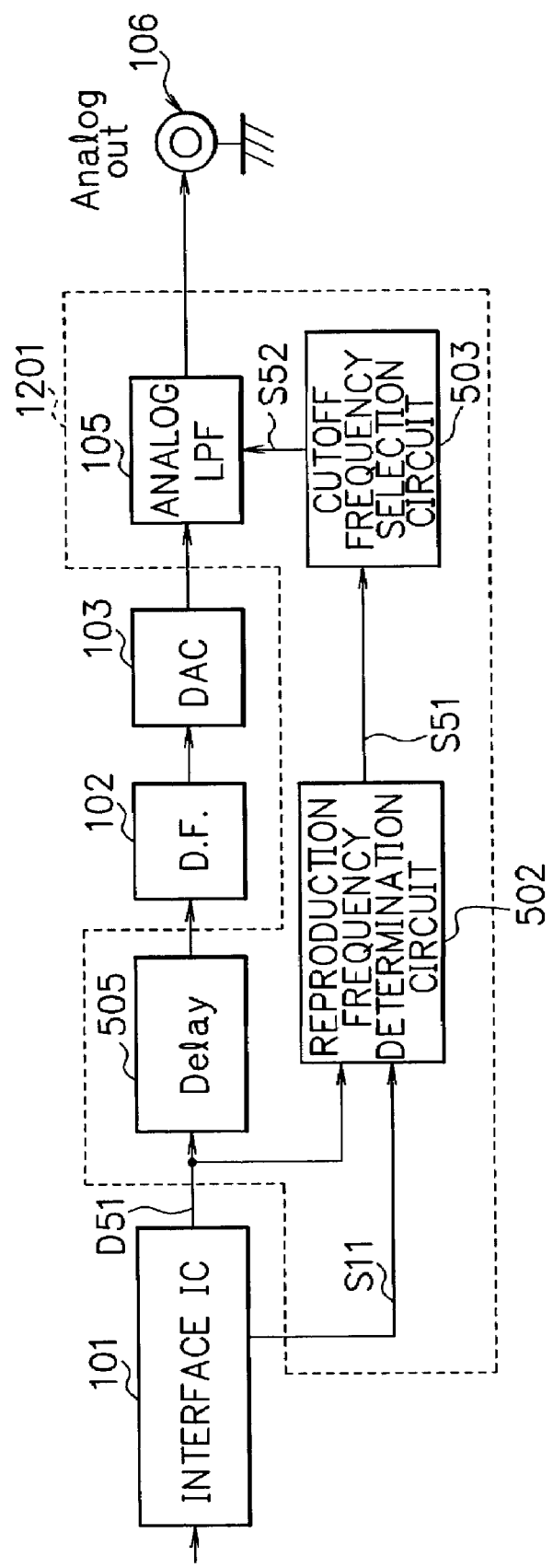
F I G. 12

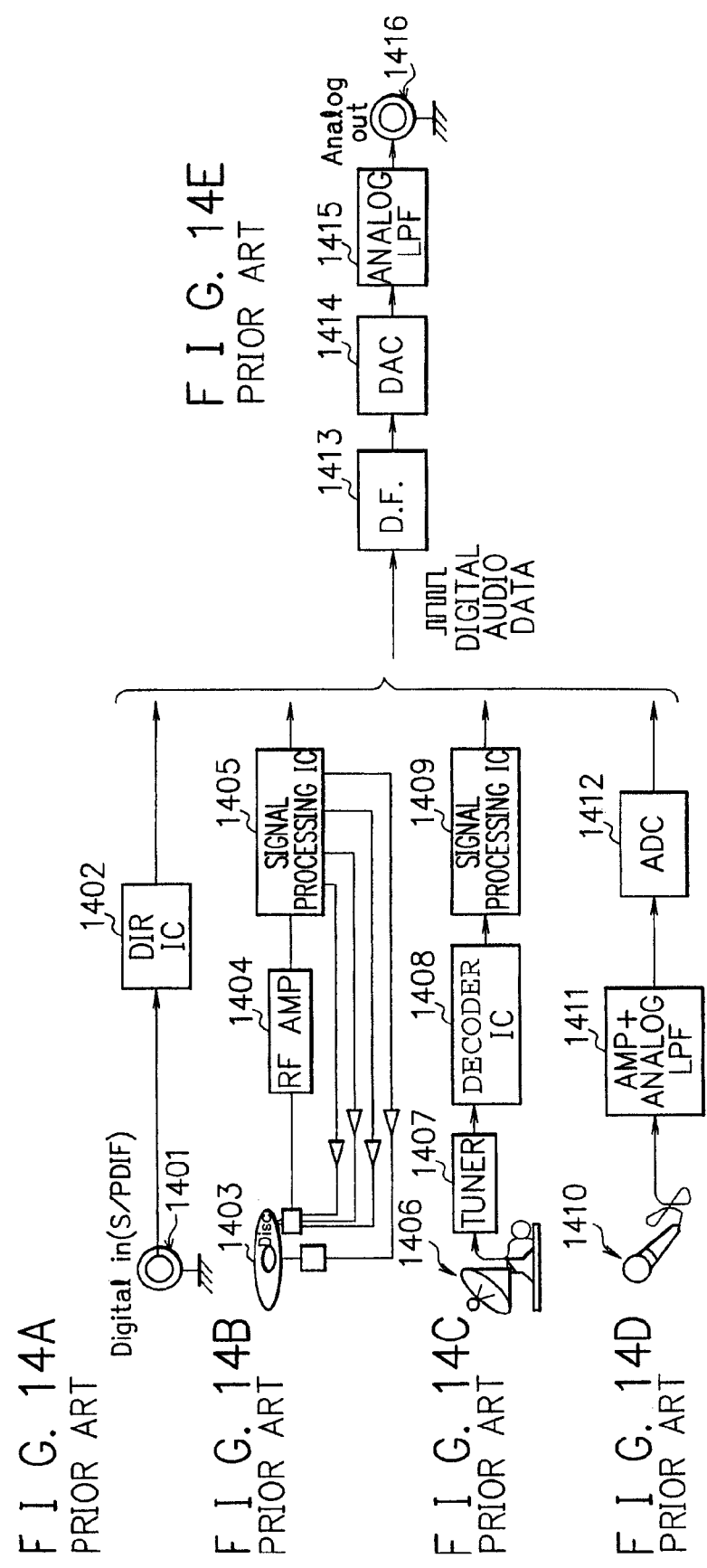

FIG. 15
PRIOR ART

| TYPE OF CONSUMER INSTRUMENT | SAMPLING FREQUENCY fs |
|---|---|
| CD/MD PLAYER | 44.1(kHz) |
| BS/CS TUNER | 32,48(kHz) |
| DAT PLAYER | 32,44.1,48(kHz) |

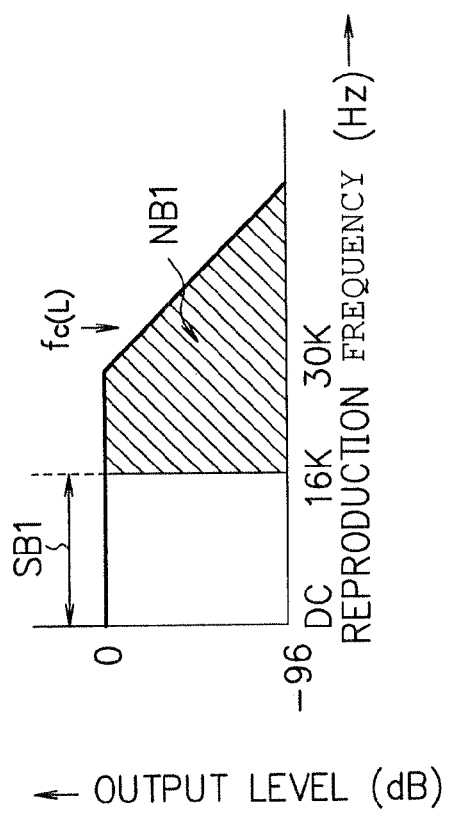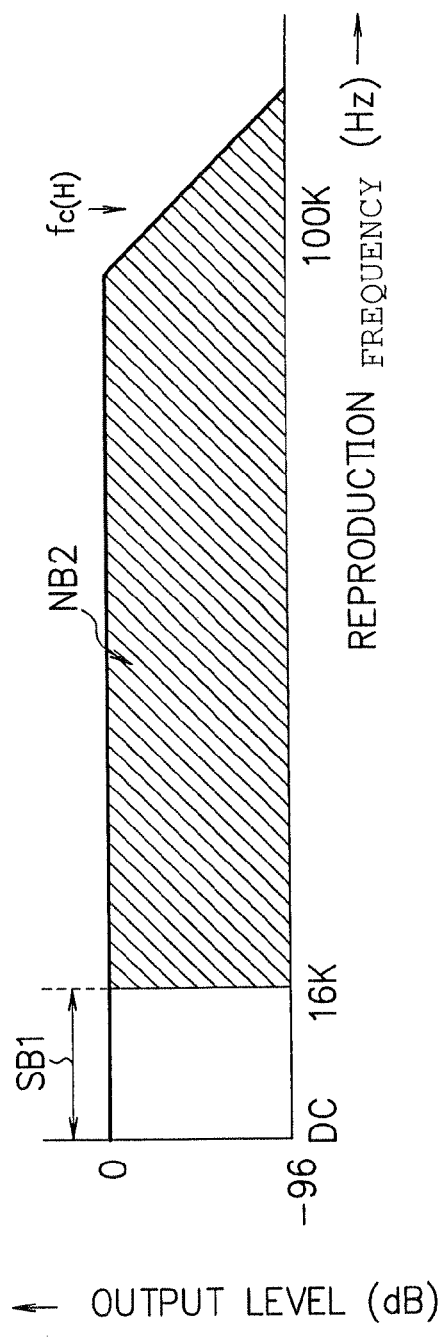
FIG. 16A PRIOR ART
FIG. 16B PRIOR ART

US 7,421,055 B2

SIGNAL PROCESSING APPARATUS AND SIGNAL PROCESSING METHOD

CROSS-REFERENCE TO RELATED APPLICATIONS

This application is based upon and claims the benefit of priority from the prior Japanese Patent Application No. 2002-077219, filed on Mar. 19, 2002, the entire contents of which are incorporated herein by reference.

BACKGROUND OF THE INVENTION

1. Field of the Invention

The present invention relates to a signal processing apparatus and signal processing method and, more particularly, to an apparatus and method suitably used in a digital audio instrument that demodulates an input digital signal and outputs an analog signal.

2. Description of the Related Art

Conventionally, consumer digital audio instruments include a CD (Compact Disc) player, MD (Mini Disc) player, DAT (Digital Audio Tape) player, BS (Broadcasting Satellite)/CS (Communication Satellite) broadcast tuner, and the like.

FIGS. 14A to 14E show examples of the arrangements of the conventional digital audio instruments.

Digital audio data output from each of pre-stage circuits and the like indicated by FIGS. 14A to 14D undergoes predetermined processes by a post-stage circuit indicated by FIG. 14E and is demodulated into an analog signal, thus outputting the analog signal.

FIG. 14A indicates an example of an instrument having a digital input terminal, and a digital signal is input from a digital input terminal 1401 (e.g., an input terminal complying with the S/PDIF (Sony Philips digital interface) standard or the like). The input digital signal is output via a digital audio interface receiver IC (integrated circuit) 1402 (to be referred to as a "DIR IC" hereinafter) as an interface conversion IC provided to connect the post-stage circuit indicated by FIG. 14E.

FIG. 14B indicates an example of a CD player or MD player, and a signal read out from a recording medium 1403 such as a CD, MD, or the like using a laser beam is amplified by an RF amplifier 1404 (to be referred to as an "RF AMP" hereinafter). Furthermore, the amplified signal undergoes a predetermined process by a signal processing IC 1405, and is then output to the post-stage circuit.

FIG. 14C indicates an example of a BS/CS broadcast tuner, and a signal, which is transmitted as a broadcast wave and is received by an antenna 1406, is input to and demodulated by a tuner 1407. Furthermore, the demodulated signal is decoded by a decoder IC 1408, and then undergoes a predetermined process by a signal processing IC 1409. The processed signal is then output to the post-stage circuit.

FIG. 14D indicates an example of an audio input, and an audio signal input via an audio input instrument 1410 such as a microphone or the like is processed by an amplifier & analog low-pass filter (LPF) 1411. The processed signal is converted into digital data by an A/D converter 1412, and the digital data is output to the post-stage circuit.

Each digital audio data output as described above undergoes a filtering process, i.e., is up-sampled by a digital filter 1413 in the post-stage circuit indicated by FIG. 14E. Note that the cutoff frequency of the digital filter 1413 is ½ the sampling frequency of input digital data according to the sampling theorem.

Furthermore, the digital audio data that has undergone the filtering process by the digital filter 1413 is converted into an analog audio signal by a D/A converter 1414, and an analog LPF 1415 removes, from that analog signal, noise (quantization noise or RF noise) generated upon conversion from the digital signal to the analog signal by the D/A converter 1414. The analog signal is then output from an analog output terminal 1416.

FIG. 15 shows the sampling frequencies of the aforementioned conventional digital audio instruments, and the sampling frequency of the CD or MD player is 44.1 kHz. The sampling frequency of the BS/CS broadcast tuner is 32 kHz or 48 kHz, and that of the DAT player is 32 kHz, 44.1 kHz, or 48 kHz.

In this manner, the sampling frequency of the conventional digital audio instrument is one of 32 kHz, 44.1 kHz, and 48 kHz. For this reason, each of the conventional digital audio instruments shown in FIGS. 14A to 14E can reproduce an analog signal without data loss from input digital data when the cutoff frequency of the analog LPF 1415 at a final stage of the post-stage circuit is set at 24 kHz or higher, which is ½ of 48 kHz as the highest one of the three different sampling frequency, on the basis of the sampling theorem.

For example, in a practical product, the cutoff frequency of a digital filter is ½ the sampling frequency of a connected instrument (a circuit for inputting digital data) (for example, in case of a CD or MD player with the sampling frequency=44.1 kHz, the cutoff frequency=22.05 kHz; in case of a BS/CS broadcast tuner with the sampling frequency=32 kHz, the cutoff frequency=16 kHz). The analog LPF uses an operational amplifier, and is normally designed to have a cutoff frequency that assumes a fixed value within the range from 30 to 50 kHz.

In this manner, in the conventional digital audio instruments, the sampling frequency of input digital data falls within the range from 32 to 48 kHz, and does not have large differences depending on digital data. For this reason, in the conventional digital audio instruments, even when the cutoff frequency of filters (digital filter, analog LPF) is fixed at a predetermined value, an output analog signal upon reproduction does not suffer any serious problem.

Recently, a DVD-Video player with a sampling frequency of 96 kHz, a sound board for a personal computer, which can input/output data in conformity to the S/PDIF standard or the like with a sampling frequency of 96 kHz, and a DVD-Audio player with a sampling frequency of 192 kHz have been commercially available. As described above, the sampling frequency of consumer digital audio instruments falls within the range from 32 kHz to 192 kHz, and the sampling frequency range has largely broadened.

However, although digital data corresponding to the broadened sampling frequency range from 32 kHz to 192 kHz can be input (can undergo a reproduction process), if the cutoff frequency of the analog LPF arranged at the final stage is set at a fixed value falling within the range from 30 to 50 kHz as in the conventional instruments, when a medium (e.g., DVD-Audio) that records digital data with a sampling frequency of 192 kHz is reproduced, a signal up to 96 kHz can be reproduced according to the sampling theorem, but a reproduced signal beyond the range from 30 kHz to 50 kHz is lost in practice.

On the other hand, if the cutoff frequency of the analog LPF is set near 100 kHz about ½ of 192 kHz as the sampling frequency, when digital data with a sampling frequency of 32 kHz (e.g., BS broadcast tuner) is reproduced, frequency components within the range from 16 to 100 kHz as an unnecessary frequency band that include noise generated by, e.g., a D/A converter (components of such unnecessary frequency band upon reproduction will be referred to as "out-of-band noise components" hereinafter) are also reproduced as noise components, as shown in FIG. 16B.

FIGS. 16A and 16B show the frequency bands of reproduced signals output from digital audio instruments upon reproducing digital data with a sampling frequency of 32 kHz. FIG. 16A shows the frequency band of a reproduced signal by an instrument which is incompatible to digital data with a sampling frequency of 96 kHz or 192 kHz, and in which a cutoff frequency fc(L) of an LPF is 30 kHz. On the other hand, FIG. 16B shows the frequency band of a reproduced signal by an instrument which is compatible to digital data with a sampling frequency of 96 kHz or 192 kHz, and in which a cutoff frequency fc(H) of an LPF is 100 kHz.

As shown in FIGS. 16A and 16B, the reproduced signal output from the instrument in which the cutoff frequency of the LPF is 30 kHz has a frequency band from 0 to 30 kHz, and the reproduced signal output from the instrument in which the cutoff frequency of the LPF is 100 kHz has a frequency band from 0 to 100 kHz. However, a region required to reproduce digital data with a sampling frequency of 32 kHz is a region SB1 from 0 to 16 kHz according to the sampling theorem. Hence, components NB1 and NB2 with frequencies higher than 16 kHz in the reproduced signals are out-of-band noise components, and are reproduced as noise in the reproduced signals.

As can be seen from FIGS. 16A and 16B, the instrument in which the cutoff frequency of the LPF is 100 kHz has a larger area of out-of-band noise components than that of the instrument in which the cutoff frequency of the LPF is 30 kHz, and the S/N (signal/noise) ratio and THD+N (noise+distortion ratio) characteristics deteriorate. For this reason, upon simply comparing numerical values of performance, the performance of the instrument which is compatible to digital data with a sampling frequency of 96 kHz or 192 kHz is worse than that of the incompatible instrument.

SUMMARY OF THE INVENTION

The present invention has been made in consideration of the above problems, and has as its object to output an analog signal from which unnecessary out-of-band noise components are appropriately removed depending on digital data to be reproduced.

A signal processing circuit of the present invention comprises a detection circuit for detecting the frequency level of a reproduced signal obtained from digital data, and a filter circuit for controlling to change the cutoff frequency of a filter in accordance with the level of the reproduced signal, and executing a filter process of a signal based on digital data.

According to the present invention with the above arrangement, unnecessary out-of-band noise components can be removed from a reproduced signal obtained by demodulating digital data, using the filter, the cutoff frequency of which is controlled to be changed to an appropriate value in accordance with the frequency level.

On the other hand, when the sampling frequency of digital data is detected from input data by the detection circuit, the cutoff frequency of the filter is controlled to be changed in accordance with the detected sampling frequency, and an analog reproduced signal obtained by demodulating the digital data undergoes a filter process, unnecessary out-of-band noise components can be removed from an analog reproduced signal using the filter, the cutoff frequency of which is controlled to be changed to an appropriate value in accordance with the sampling frequency.

BRIEF DESCRIPTION OF THE DRAWINGS

FIG. 10 is a circuit diagram showing an example of a digital LPF;

FIG. 12 is a block diagram showing an example of the arrangement of a digital audio instrument to which a signal processing apparatus according to the third embodiment is applied;

FIGS. 14A to 14E are block diagrams showing examples of conventional digital audio instruments;

FIG. 15 is a table showing the sampling frequencies of the conventional digital audio instruments; and FIGS. 16A and 16B are graphs for explaining the frequency bands of reproduced signals according to the cutoff frequencies of an LPF.

DETAILED DESCRIPTION OF THE PREFERRED EMBODIMENTS

Preferred embodiments of the present invention will be described hereinafter with reference to the accompanying drawings.

First Embodiment

Figure 1:
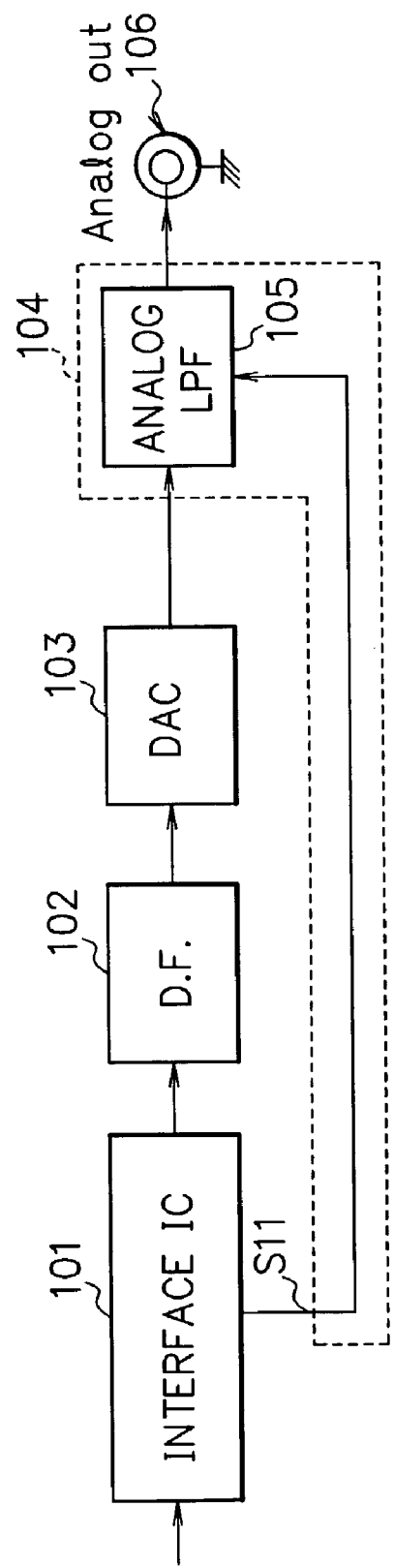
FIG. 1 is a block diagram showing an example of the arrangement of a digital audio instrument to which a signal processing apparatus according to the first embodiment is applied.

FIG. 1 is a block diagram showing an example of the arrangement of a digital audio instrument to which a signal processing apparatus according to the first embodiment of the present invention is applied.

Referring to FIG. 1, reference numeral 101 denotes an interface IC, which executes a conversion process and the like of an input signal to allow the subsequent circuits to process that signal, and outputs obtained digital audio data (to be also simply referred to as "digital data" hereinafter). The interface IC 101 outputs sampling frequency information S11 of the digital data. The interface IC comprises a DIR IC which has a digital input terminal complying with the digital interface standard such as the S/PDIF standard or the like, a signal processing IC which extracts required audio components from an input signal, converts them into a digital signal, and outputs the digital signal, and the like.

Reference numeral 102 denotes a digital filter, which removes RF noise from the digital data which has undergone the conversion process and the like and is output from the interface IC 101. The digital filter 102 comprises an interpolation filter for digital audio data. The cutoff frequency of the digital filter 102 is about half the sampling frequency of the digital data, as shown in FIG. 2.

Figure 2:
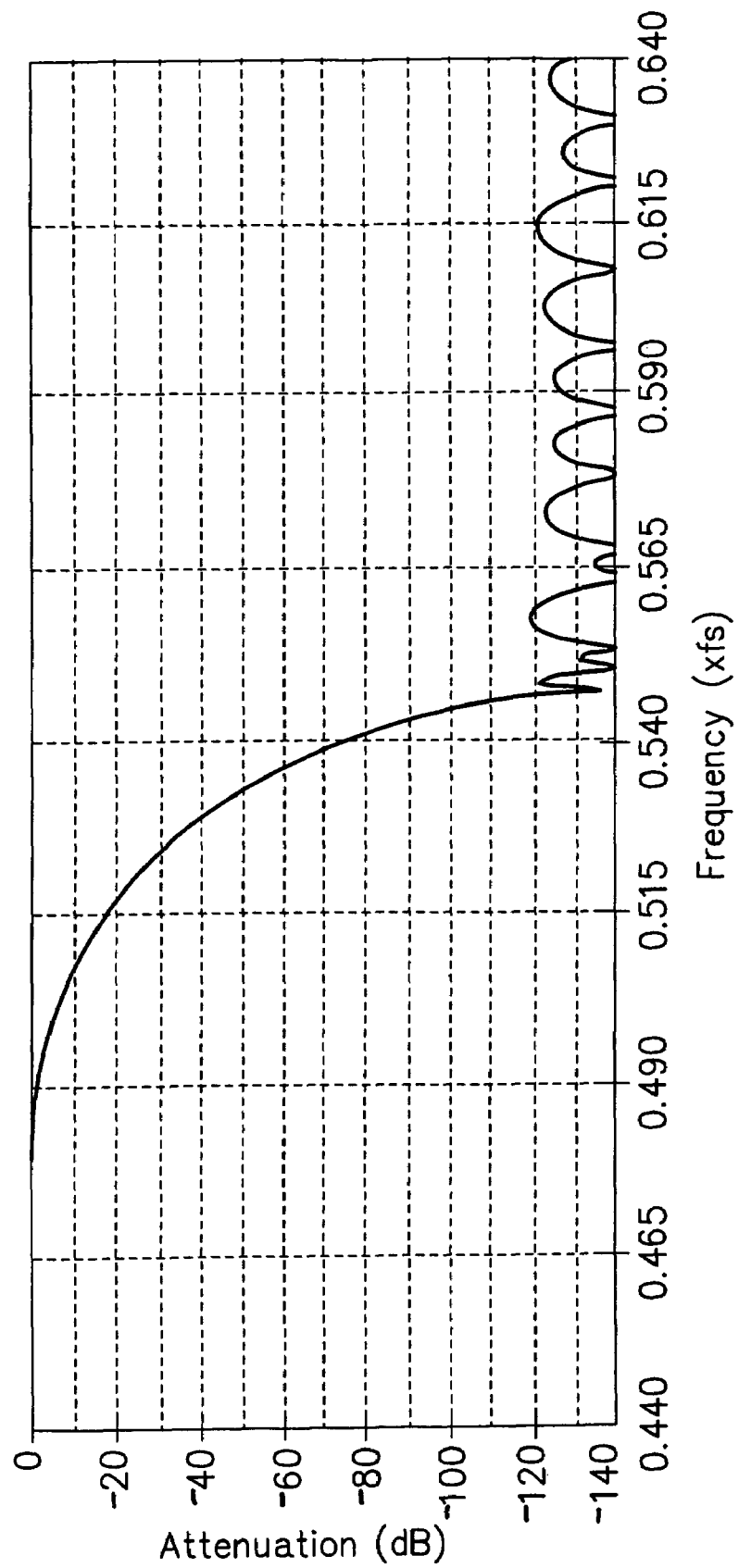
FIG. 2 is a graph showing the frequency characteristics of a digital filter.

FIG. 2 shows an example of the frequency characteristics of the digital filter 102.

Referring to FIG. 2, the horizontal axis represents a frequency (more specifically, a multiplier to be multiplied by the sampling frequency), and the vertical axis represents an attenuation level. The digital filter with the frequency characteristics shown in FIG. 2 attenuates frequency components of the sampling frequency×(0.540) by −73 dB. For example, when digital data with a sampling frequency of 44.1 kHz is input, frequency components of 44.1×(0.540)=23.8 kHz attenuate by −73 dB; when digital data with a sampling frequency of 96 kHz is input, frequency components of 96×(0.540)=51.8 kHz attenuate by −73 dB.

Reference numeral 103 denotes a D/A conversion IC, which has a resolution of, e.g., 16 to 24 bits, and converts digital data output from the digital filter 102 into an analog signal.

Reference numeral 104 denotes a filter unit which comprises an analog LPF 105 in the first embodiment. The analog LPF 105 is formed using an operational amplifier, as shown in, e.g., FIGS. 3A and 3B, and removes RF components such as RF noise and the like as out-of-band noise components from the analog signal output from the D/A conversion IC 103. The cutoff frequency of the filter of the analog LPF 105 is switched to an appropriate value on the basis of the sampling frequency information S11 to remove RF components from the analog signal. Note that the analog LPF 105 may have a function as an output buffer.

Figure 3A:
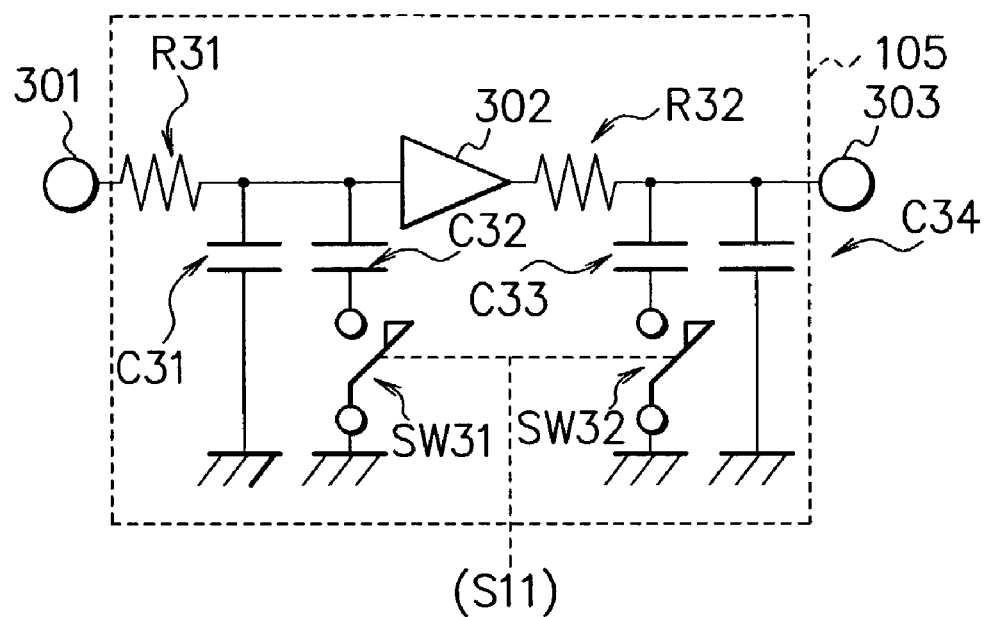
FIGS. 3A and 3B are circuit diagrams showing examples of the arrangement of an analog LPF.
Figure 3B:
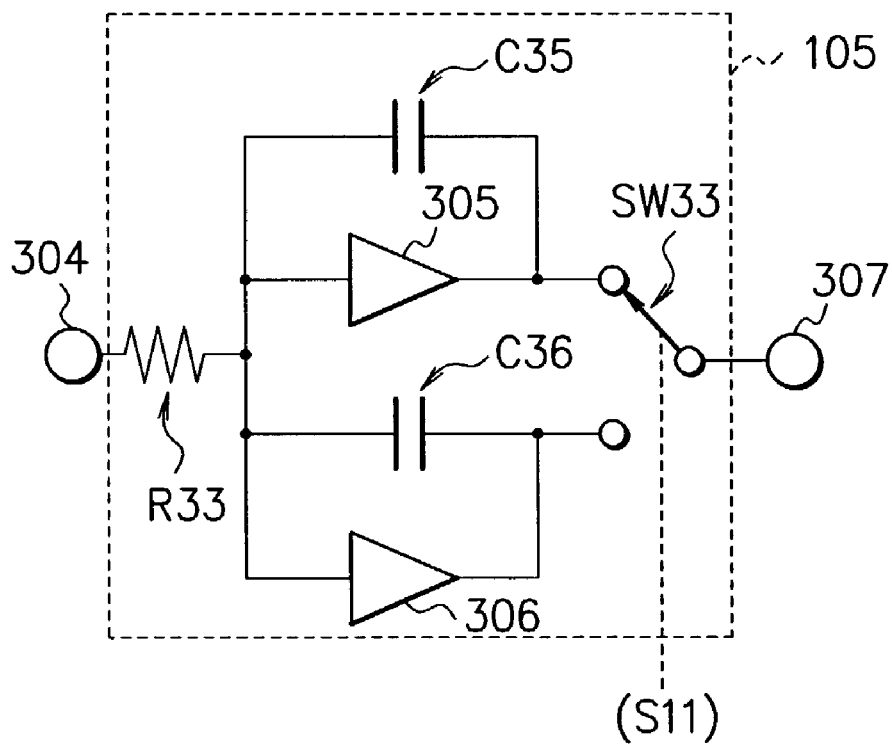

FIGS. 3A and 3B show examples of the arrangement of the analog LPF 105.

The analog LPF 105 shown in FIG. 3A comprises an operational amplifier 302, two resistors R31 and R32, four capacitors C31 to C34, and two 2-contact switches SW31 and SW32.

The resistors R31 and R32, and the operational amplifier 302 are connected in series between an input terminal 301 and output terminal 303 of the analog LPF in the order of the resistor R31, operational amplifier 302, and resistor R32. One terminal of each of the capacitors C31 and C32 is connected to the node between the resistor R31 and the input terminal of the operational amplifier 302, and one terminal of each of the capacitors C33 and C34 is connected to the node between the output terminal of the operational amplifier 302 and the resistor R32. The other terminal of each of the capacitors C31 to C34 is connected to the ground (ground potential) and, especially, the other terminal of each of the capacitors C32 and C33 is connected to the ground via the switch SW31 and SW32, respectively.

Note that the switches SW31 and SW32 are synchronously performed ON/OFF control in accordance with the sampling frequency information S11 output from the interface IC 101 shown in FIG. 1. In this manner, the capacitance of the analog LPF 105 as a whole is switched to switch the cutoff frequency of the analog LPF 105. More specifically, when the switches SW31 and SW32 are OFF (open), the analog LPF 105 has a high cutoff frequency; when the switches SW31 and SW32 are ON (closed), it has a low cutoff frequency.

The analog LPF 105 shown in FIG. 3B comprises two operational amplifiers 305 and 306, one resistor R33, two capacitors C35 and C36, and one 3-contact switches SW33. Note that the operational amplifiers 305 and 306 have the same characteristics, and the capacitors C35 and C36 have different capacitances.

One terminal of the resistor R33 is connected to an input terminal 304 of the analog LPF 105, and the other terminal of the resistor R33 is connected to the node between the input terminal of the operational amplifier 305 and one terminal of the capacitor C35, and the node between the input terminal of the operational amplifier 306 and one terminal of the capacitor C36. Also, the node between the output terminal of the operational amplifier 305 and the other terminal of the capacitor C35, and the node between the output terminal of the operational amplifier 306 and the other terminal of the capacitor C36 are connected to an output terminal 307 of the analog LPF 105 via the switch SW33.

The switch SW33 is controlled to selectively connect one of the node between the output terminal of the operational amplifier 305 and the other terminal of the capacitor C35, and the node between the output terminal of the operational amplifier 306 and the other terminal of the capacitor C36 to the output terminal 307 of the analog LPF 105 in accordance with the sampling frequency information S11 output from the interface IC 101.

If the capacitance of the capacitor C36 is smaller than that of the capacitor C35, the cutoff frequency (e.g., 100 kHz) of an analog LPF formed by the resistor R33, operational amplifier 306, and capacitor C36 becomes higher than that (e.g., 40 kHz) of an analog LPF formed by the resistor R33, operational amplifier 305, and capacitor C35.

Therefore, by controlling the switch SW33 in accordance with the sampling frequency information S11, the cutoff frequency of the analog LPF 105 can be switched. Note that the analog LPF 105 comprises an analog LPF. However, the present invention is not limited to a low-pass filter but may use an analog bandpass filter having the same arrangement.

Reference numeral 106 denotes an analog output terminal used to externally output the analog signal that has been processed by the analog LPF 105.

The operation will be described below.

An externally supplied input signal undergoes a predetermined conversion process and the like in the interface IC 101, and is then output as digital data to the digital filter 102. At this time, the interface IC 101 extracts information that pertains to the sampling frequency of the digital data from the input signal, and outputs it as sampling frequency information S11 to the analog LPF 105. The information that pertains to the sampling frequency of the digital data is output by extracting that information from a sampling frequency data field of digital data (containing an audio data field and sampling frequency data field) or by detecting the sampling frequency from the frequency of the digital data. The function of extracting or detecting the information that pertains to the sampling frequency of the digital data, and outputting the information can be implemented by a function of the existing interface IC 101.

The digital data supplied to the digital filter 102 undergoes a filter process, i.e., is up-sampled at an 8× frequency by an interpolation filter that forms the digital filter 102. As a result, frequency components of frequencies ½ or higher the sampling frequency of the digital data largely attenuate. In this manner, image noise due to the fundamental sampling frequency contained in the digital data can be removed as RF noise, and the load on the analog LPF connected to the latter stage can be reduced.

The digital data from which RF noise has been removed by the process in the digital filter 102 is supplied to the D/A conversion IC 103, and undergoes a digital-analog (D/A) conversion process from digital data into an analog signal, thus outputting an analog audio signal.

The analog audio signal output from the D/A conversion IC 103 is supplied to the analog LPF 105, and RF components are removed from that signal in accordance with the sampling frequency information S11. The analog LPF 105 can remove quantization noise generated by the D/A conversion process in the D/A conversion IC 103, and RF noise generated by noise shaving or the like in the D/A conversion IC 103.

Assume that the cutoff frequency of the analog LPF 105 can be switched between 40 kHz and 100 kHz in accordance with the sampling frequency information S11. At this time, if it is determined based on the sampling frequency information S11 that the sampling frequency of digital data as the source signal (before demodulation) of the analog audio signal is less than 88.2 kHz (e.g., 32 kHz, 44.1 kHz, 48 kHz, or the like), the cutoff frequency of the analog LPF 105 is switched to 40 kHz; if it is determined that the sampling frequency of the digital data is 88.2 kHz or higher (e.g., 96 kHz, 192 kHz, or the like), the cutoff frequency of the analog LPF 105 is switched to 100 kHz. In this fashion, since the cutoff frequency of the analog LPF 105 is switched in accordance with the sampling frequency of digital data as the source of the analog audio signal, unnecessary out-of-band noise components can be removed from the analog signal.

The analog signal that has been demodulated from the digital data by the signal processing apparatus, and from which unnecessary out-of-band noise components have been removed is output from the analog output terminal 106.

Figure 4A:
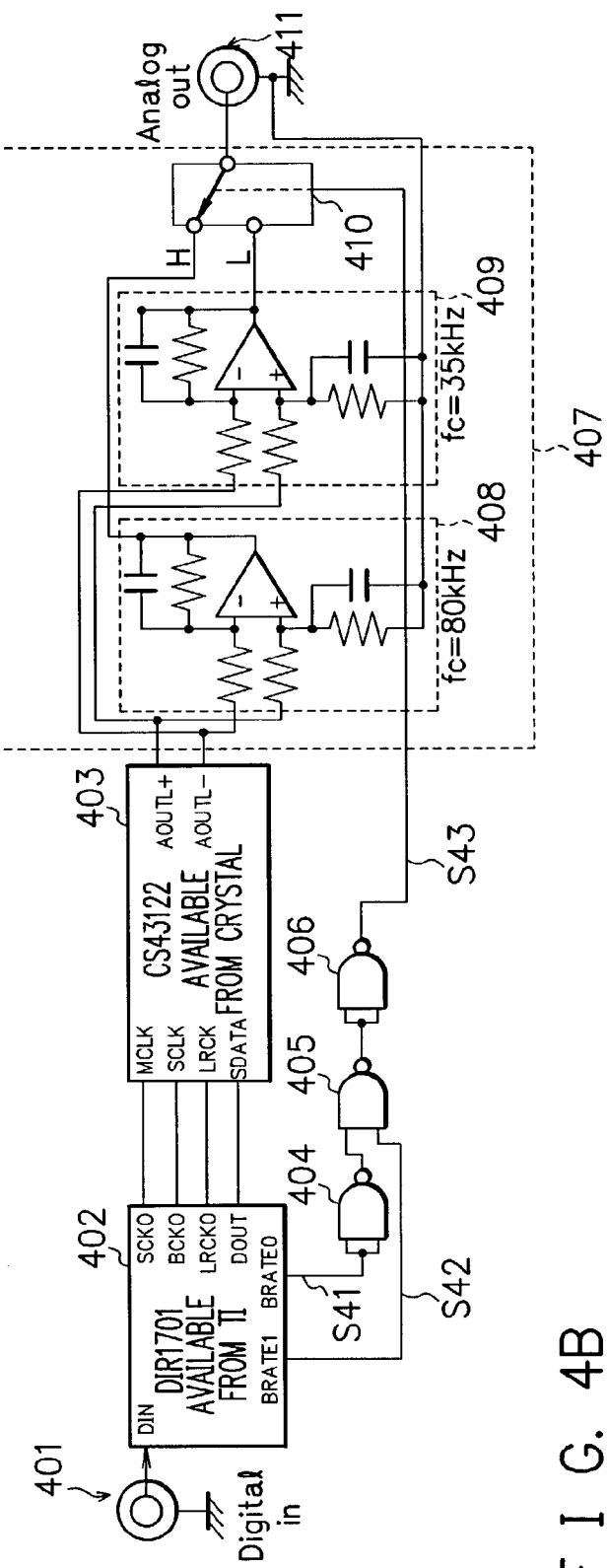
FIGS. 4A and 4B are circuit diagrams showing examples of practical arrangements of digital audio instruments to which the signal processing apparatus according to the first embodiment is applied.

FIG. 4A shows an example of a practical arrangement of a digital audio instrument to which the signal processing apparatus according to the first embodiment of the present invention is applied.

Referring to FIG. 4A, reference numeral 402 denotes a DIR IC (DIR1701: available from Texas Instrument Inc) corresponding to the interface IC 101 shown in FIG. 1. Reference numeral 403 denotes an IC (CS43122: available from CRYSTAL) corresponding to the digital filter 102 and D/A conversion IC 103 shown in FIG. 1; and 407, an analog LPF.

A terminal DIN of the DIR IC 402 is connected to a digital input terminal 401, and terminals SCKO, BCKO, LRCKO, and DOUT of the DIR IC 402 are respectively connected to terminals MCLK, SCLK, LRCK, and SDATA of the IC 403. With this arrangement, digital data input from the digital input terminal 401 via the terminal DIN of the DIR IC 402 is output from the terminal DOUT to the terminal SDATA of the IC 403. The digital data input via the terminal SDATA of the IC 403 undergoes a filter process and D/A conversion process in the IC 403, and is output as an analog signal from terminals AOUTL+ and AOUTL− to the analog LPF 407.

The analog LPF 407 comprises two filters 408 and 409, which have a common input terminal and different cutoff frequencies (cutoff frequencies=80 kHz and 35 kHz), and a relay 410 used to selectively output the outputs from the filters 408 and 409 to an analog output terminal 411.

The DIR IC 402 indicates information that pertains to the sampling frequency of the input digital data by logical values of two signals S41 and S42 output from its two terminals BRATE0 and BRATE1. More specifically, if the sampling frequency of the digital data is 32 kHz, both the signals S41 and S42 change to "H"; if the sampling frequency is 44.1 kHz, both the signals S41 and S42 change to "L". If the sampling frequency of the digital data is 48 kHz, the signal S41 changes to "H", and the signal S42 changes to "L"; if the sampling frequency is 88.2 or 96 kHz, the signal S41 changes to "L", and the signal S42 changes to "H".

For this reason, in the example shown in FIG. 4A, three NOR gates 404 to 406 make logical arithmetic operations of the signals S41 and S42, and output an arithmetic operation result to the relay 410 in the analog LPF 407 as a signal S43. If the sampling frequency of the digital data is 32, 44.1, or 48 kHz, "L" is output as the signal S43; if the sampling frequency is 88.2 or 96 kHz, "H" is output as the signal S43. Note that these three NOR gates 404 to 406 use IC called 74HC00 and the like.

With the aforementioned arrangement, when digital data which is recorded on, e.g., a CD at a sampling frequency of 44.1 kHz is input from the digital input terminal 401, the signal S43 changes to "L", and a contact is connected to the L side of the relay 410. In this manner, the filter 409 having the cutoff frequency of 35 kHz is selected, and an output (analog signal) from the filter 409, from which frequency components higher than 35 kHz have been removed, is output from the analog output terminal 411.

On the other hand, when digital data which is recorded on, e.g., a DVD at a sampling frequency of 96 kHz is input from the digital input terminal 401, the signal S43 changes to "H", and the contact is connected to the H side of the relay 410. In this manner, the filter 408 having the cutoff frequency of 80 kHz is selected, and an output (analog signal) from the filter 408, which has frequency components of 80 kHz or lower (an analog signal which is free from any omissions from the digital data and contains all frequency components of 48 kHz or lower) is output from the analog output terminal 411.

In the example shown in FIG. 4A, whether the sampling frequency of input digital data is equal to or higher than or less than 88.2 kHz alone is detected, and is determined by the standard, recording medium, or the like. Hence, since the sampling frequency of input digital data remains the same as long as the standard, recording medium, or the like remains the same, the relay 410 is never switched during output of an analog signal (during reproduction of digital data), and no sound discontinuity occurs even when the relay 410 is used as a switch for the filters 408 and 409.

Also, in the example shown in FIG. 4A, the DIR IC 402 corresponding to the interface IC 101 shown in FIG. 1 is used. However, when a recording medium such as a CD, DVD, or the like is read to input a signal (in case of a CD or DVD player or the like), a signal processing IC shown in FIG. 4B is used.

Figure 4B:
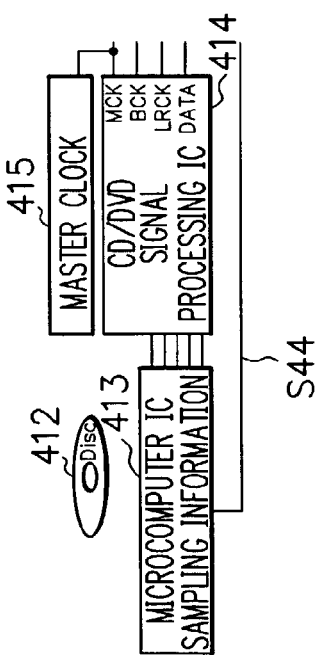

Referring to FIG. 4B, reference numeral 412 denotes a recording medium (Disc or the like) on which digital data is recorded; and 413, a microcomputer IC which executes a predetermined process and outputs sampling frequency information S44. Reference numeral 414 denotes a signal processing IC, which extracts required audio components from a signal obtained from the recording medium 412 via a pickup and RF amplifier, and converts the extracted audio components into a digital signal; and 415, a master clock output circuit which outputs master clocks used in the signal IC 414 and IC 403.

As described in detail above, according to the first embodiment, the interface IC 101 detects the sampling frequency of input digital data and outputs it as sampling frequency information S11, and the analog LPF 105 selects a filter with an appropriate cutoff frequency on the basis of the sampling frequency information S11 and removes RF noise as out-of-band noise components from an analog audio signal obtained by the D/A conversion process in the D/A conversion IC 103.

In this manner, the cutoff frequency in the analog LPF 105 can be switched without adding or changing many circuit components or the like, and when the cutoff frequency is switched appropriately, unnecessary out-of-band noise components can be appropriately removed from an analog audio signal obtained by demodulating digital data in accordance with the sampling frequency of the digital data.

Since the cutoff frequency of the filter can be appropriately controlled for digital data with a low sampling frequency in accordance with that sampling frequency, the S/N ratio and THD+N characteristics can be improved compared to a conventional instrument in which the cutoff frequency of a filter is set at 100 kHz to assure compatibility to digital data with a sampling frequency of 192 kHz.

In the analog LPF 105 shown in FIG. 3A, the cutoff frequency of the analog LPF 105 is switched depending on whether or not the capacitors C32 and C33 are connected to the ground. In place of such binary control, variable capacitances which are always connected to the ground may be used as the capacitors C32 and C33, and may be controlled in accordance with the sampling frequency information S11 so as to switch the cutoff frequency of the analog LPF 105 to an appropriately frequency. In such case, the cutoff frequency of the analog LPF can be continuously changed, and an arbitrary cutoff frequency can be set.

In the analog LPF 105 shown in FIG. 3B, the analog LPF 105 having two cutoff frequencies has been exemplified. However, the number of cutoff frequencies is not limited to two, and the setup values of cutoff frequencies of the analog LPF may be increased by parallelly connecting pairs of operational amplifiers and capacitors.

Second Embodiment

The second embodiment will be described below.

Figure 5:
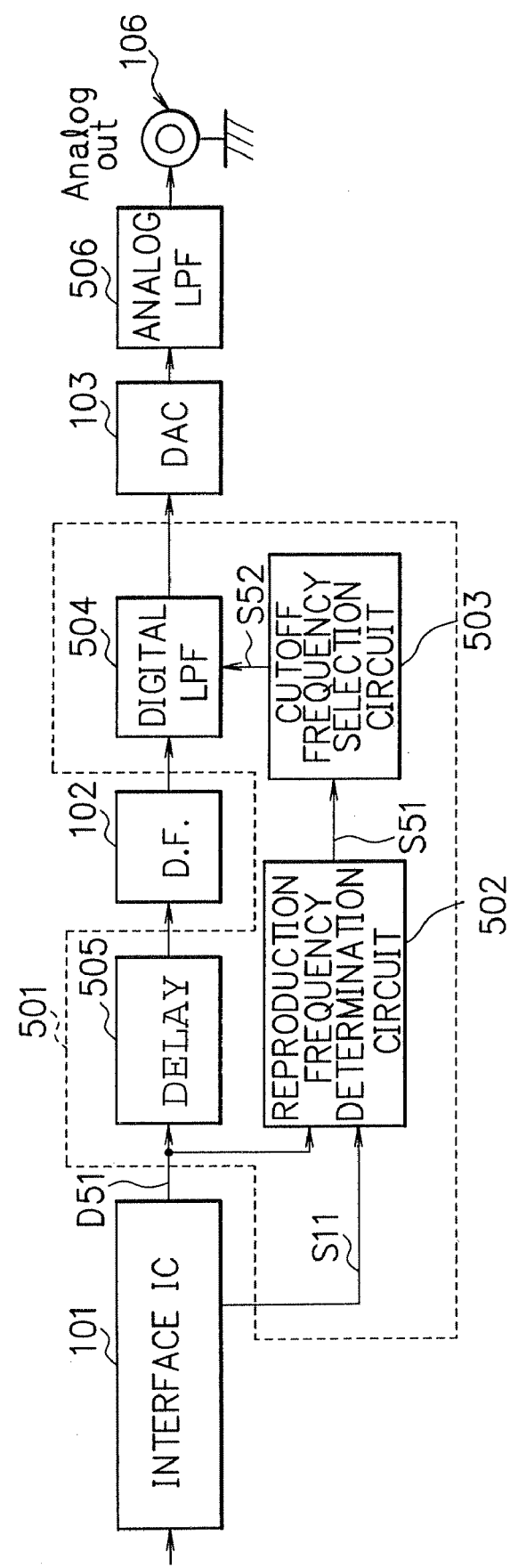
FIG. 5 is a block diagram showing an example of the arrangement of a digital audio instrument to which a signal processing apparatus according to the second embodiment is applied.

FIG. 5 is a block diagram showing an example of the arrangement of a digital audio instrument to which a signal processing apparatus according to the second embodiment of the present invention is applied. Note that the same reference numerals in FIG. 5 denote blocks having the same functions as those shown in FIG. 1, and a repetitive description thereof will be omitted.

Referring to FIG. 5, reference numeral 501 denotes a filter unit, which comprises a reproduction frequency determination circuit 502, cutoff frequency selection circuit 503, digital LPF 504, and delay circuit 505.

Figure 6:
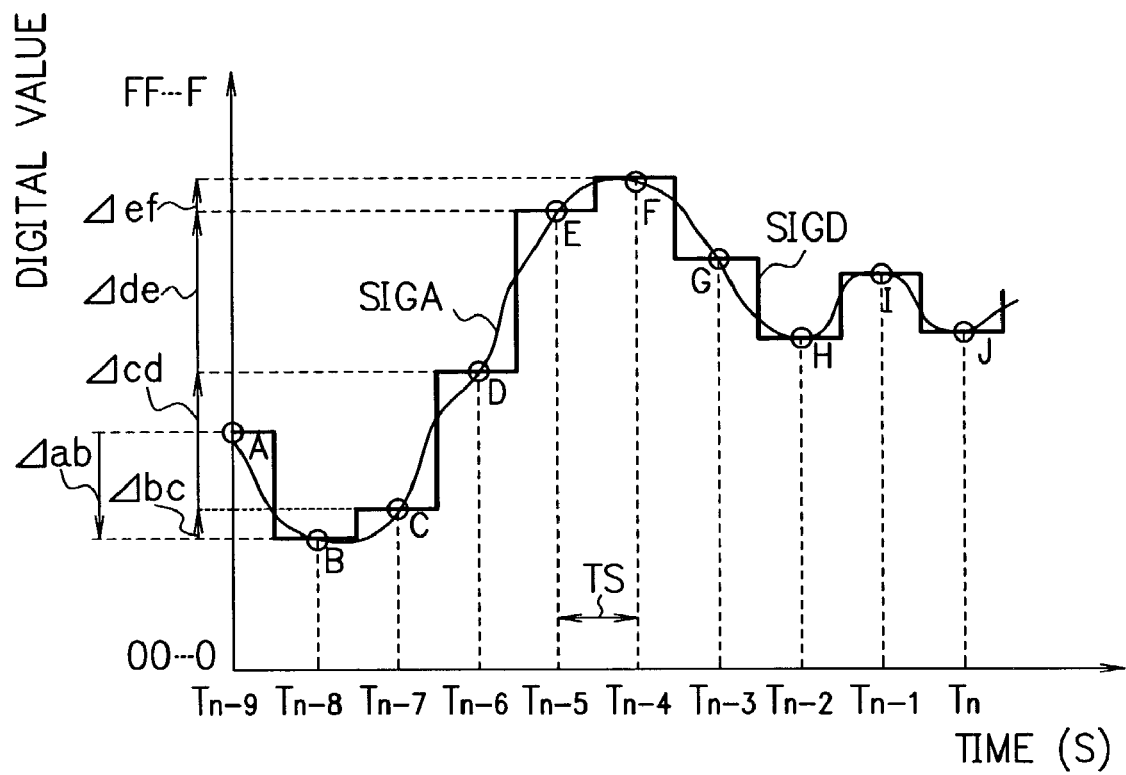
FIG. 6 is a graph for explaining the method of calculating the signal level of a reproduced signal.

The reproduction frequency determination circuit 502 calculates a frequency component (frequency level) of a reproduced signal on the basis of sampling frequency information S11 and digital data D51 supplied from the interface IC 101, as shown in FIG. 6, and outputs the calculated frequency component of the reproduced signal to the cutoff frequency selection circuit 503 as a signal S51.

FIG. 6 is a graph for explaining the method of calculating the reproduction frequency component of the digital data D51 by the reproduction frequency determination circuit 502.

Referring to FIG. 6, the horizontal axis represents a time (S), the vertical axis represents a digital value of digital data, and SIGD represents the waveform of digital data. Note that the digital value of digital data is expressed in the form of complement of 2 in digital audio, but is expressed by an offset binary code obtained by code conversion in FIG. 6. For reference, a source analog waveform SIGA of the digital data SIGD is shown.

Figure 7B:
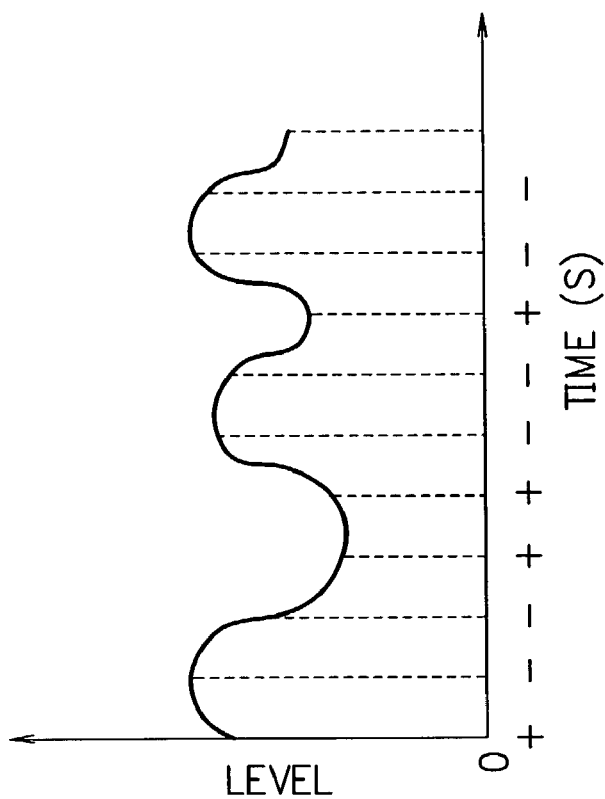
FIGS. 7A and 7B are graphs for explaining the method of discriminating the frequency level of a reproduced signal.
Figure 7A:
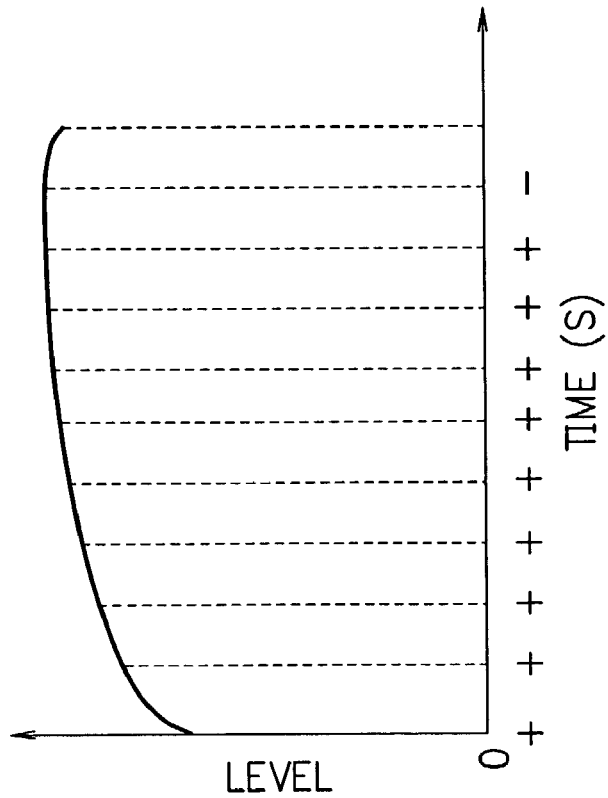

The reproduction frequency determination circuit 502 observes values A to J of digital data at sampling points $T_m$ (m is a suffix, and e.g., m=(n−9) to n) assured at every sampling time TS. The reproduction frequency determination circuit 502 determines an increase/decrease on the basis of a difference Δ between one of the digital data values A to J at a given sampling point $T_m$ and that at the next sampling point $T_{m+1}$. In the sample shown in FIG. 6, upon checking differences Δab, Δbc, Δcd, . . . , Δij, for example, the increase/decrease in difference Δab is "−" since the digital data value decreases as the time elapses and, likewise, the increase/decrease in difference Δbc is "+" since the digital data value increases as the time elapses. Also, the increases/decreases in differences Δab, Δbc, Δcd, . . . , Δij are "−++++−−+−". As can be seen from FIGS. 7A and 7B, as the same signs appear successively, the frequency component of the reproduced signal is low (FIG. 7A); as the same signs do not appear successively, it is high (FIG. 7B). In this manner, the frequency component of the reproduced signal at an arbitrary timing can be determined.

Figures 8, 9:
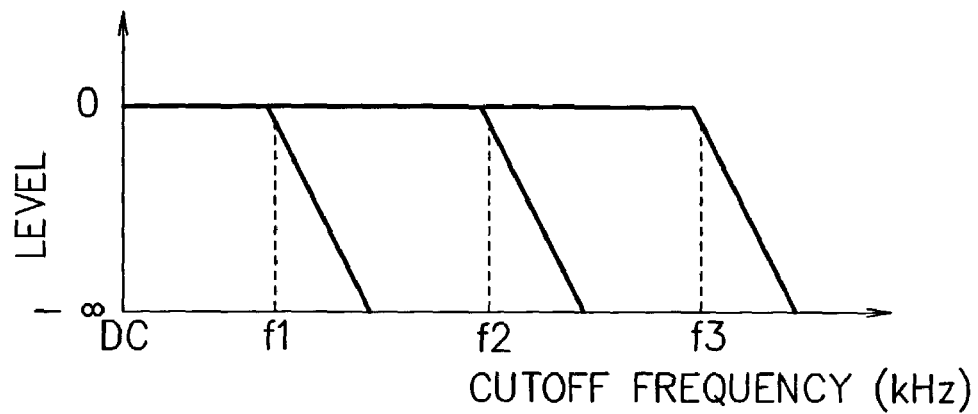
FIG. 8 is a graph showing a setup example of the cutoff frequency of an LPF.
FIG. 9 is a table showing a switching example of an LPF according to the frequency level of a reproduced signal.

The cutoff frequency selection circuit 503 selects a cutoff frequency in the digital LPF 504 on the basis of the frequency component of the reproduced signal supplied from the reproduction frequency determination circuit 502 as the signal S51 (to be more exact, a value obtained by dividing the sampling frequency by the runlength of identical signs). For example, assume that cutoff frequencies f1, f2, and f3 are set in ascending order as the cutoff frequency in the digital LPF 504, as shown in FIG. 8. The cutoff frequency selection circuit 503 compares the frequency component of the reproduced signal supplied from the reproduction frequency determination circuit 502, and the setup values f1, f2, and f3 of the cutoff frequency.

As a result, as shown in FIG. 9, if the frequency component of the reproduced signal is lower than the setup value f1 of the cutoff frequency, the cutoff frequency selection circuit 503 selects the setup value f1 as the cutoff frequency of the digital LPF 504; if the frequency component value of the reproduced signal is equal to or higher than the setup value f1 of the cutoff frequency and is lower than f2, the circuit 503 selects the setup value f2 as the cutoff frequency of the digital LPF 504. Likewise, if the frequency component value of the reproduced signal is equal to or higher than the setup value f2, the circuit 503 selects the setup value f3 as the cutoff frequency of the digital LPF 504. Furthermore, the cutoff frequency selection circuit 503 supplies the cutoff frequency of the digital LPF 504 selected in this way to the digital LPF 504 as a signal S52.

The digital LPF 504 comprises a digital filter having a plurality of cutoff frequencies which can be switched, as shown in, e.g., FIG. 10.

FIG. 10 shows an example of the digital LPF 504, and exemplifies a digital filter having three cutoff frequencies (8 kHz, 24 kHz, and 96 kHz) that can be switched. Referring to FIG. 10, reference numeral 1001 denotes a digital data input terminal. A switch SW101 is used to switch the cutoff frequency of the filter in the digital LPF, and selects one of the cutoff frequencies on the basis of the signal S52 indicating the cutoff frequency, which is selected by the cutoff frequency selection circuit 503, thus outputting data that has undergone a filter process from an output terminal 1002.

Note that FIG. 10 exemplifies the digital filter 504 having three cutoff frequencies. However, the number of cutoff frequencies is not limited to three, and may be increased in correspondence with the scale of a circuit (LSI, DSP, or the like) that forms the filter. The present invention is not limited to a low-pass filter, but may use a bandpass filter.

The delay circuit 505 is a circuit for delaying digital data to be supplied from the interface IC 101 to the digital filter 102 by a time required to determine the reproduction frequency (i.e., a time required to observe digital data values at a plurality of sampling points) in the reproduction frequency determination circuit 502. The delay circuit 505 can comprise a shift register, FIFO, or the like since it can simply temporally delay digital data. Note that the delay circuit 505 is preferably arranged when the cutoff frequency of the digital LPF 504 is switched frequently. For example, when the digital LPF 504 has only two different cutoff frequencies, or when the sampling frequency is low, and the cutoff frequency is not frequently switched, the delay circuit 505 is not always required. Reference numeral 506 denotes an analog LPF having a predetermined cutoff frequency.

With the above arrangement, an externally supplied signal is supplied to the delay circuit 505 and reproduction frequency determination circuit 502 via the interface IC 101. The interface IC 101 extracts information that pertains to the sampling frequency of digital audio data from the input signal, and supplies it as sampling frequency information S11 to the reproduction frequency determination circuit 502.

The reproduction frequency determination circuit 502 calculates the frequency component of the reproduced signal on the basis of the digital data supplied from the interface IC 101, and the cutoff frequency selection circuit 503 selects the cutoff frequency in the digital LPF 504 on the basis of the calculated frequency component of the reproduced signal. On the other hand, the digital data supplied to the delay circuit 505 is delayed a predetermined period of time by the delay circuit 505, and is supplied to the digital LPF 504 via the digital filter 102.

The digital LPF 504 executes a filter process for the received digital data at the cutoff frequency selected by the cutoff frequency selection circuit 504, and outputs the processed signal to the D/A conversion IC 103. The digital data output from the digital LPF 504 undergoes a D/A conversion process by the D/A conversion IC 103, and the analog LPF 506 removes RF noise generated by the D/A conversion process from the analog signal supplied from the D/A conversion IC 103, thus outputting an analog audio signal.

Figure 11A:
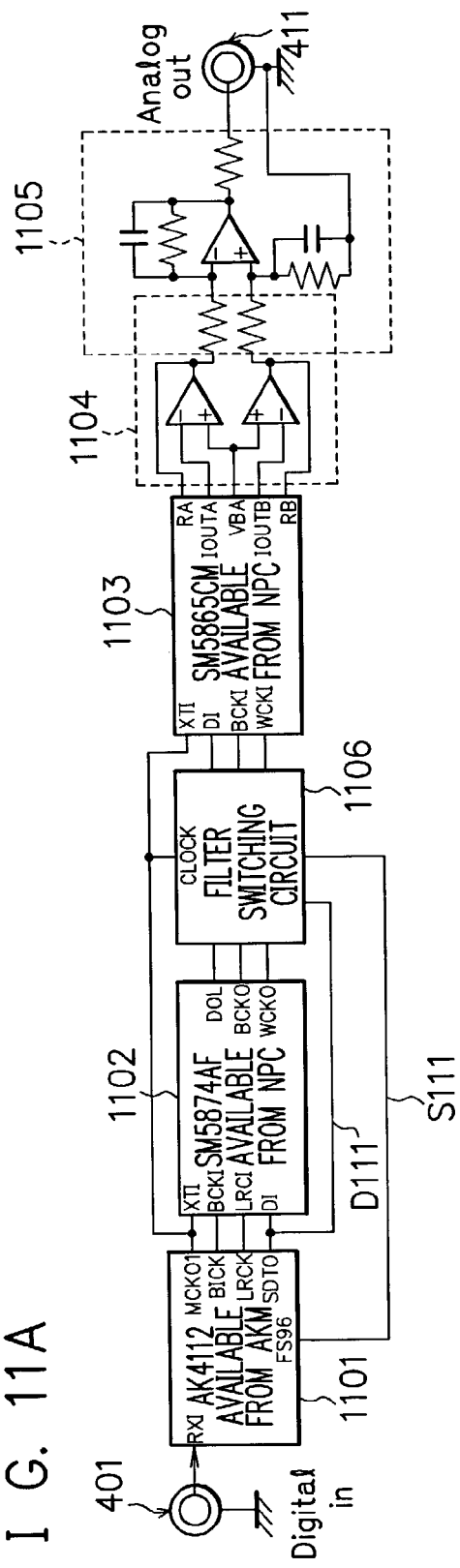
FIGS. 11A and 11B are circuit diagrams showing examples of practical arrangements of digital audio instruments to which the signal processing apparatus according to the second embodiment is applied.

FIG. 11A shows an example of a practical arrangement of a digital audio instrument to which the signal processing apparatus according to the second embodiment of the present invention is applied. Note that the same reference numerals in FIG. 11A denote blocks having the same functions as those shown in FIG. 4A, and a repetitive description thereof will be omitted.

Referring to FIG. 11A, reference numeral 1101 denotes a DIR IC (AK4112: available from AKM Semiconductor Inc) corresponding to the interface IC 101 shown in FIG. 5. The DIR IC 1101 outputs from a terminal FS96 a signal S111, which changes to "H" when the sampling frequency is 88.2 kHz or higher, in accordance with the sampling frequency of input digital data. Reference numeral 1102 denotes an IC (SM5847: available from NIPPON PRECISION CIRCUIT INC.) corresponding to the digital filter 102 shown in FIG. 5. Reference numeral 1103 denotes an IC (SM5865CM: available from NIPPON PRECISION CIRCUIT INC.) corresponding to the D/A conversion IC 103 shown in FIG. 5. Reference numeral 1106 denotes a filter switching circuit, which corresponds to the filter unit 501 shown in FIG. 5.

Reference numeral 1104 denotes an I/V conversion circuit for converting an analog signal output from the IC 1103 from a current-level signal into a voltage-level signal; and 110, an analog LPF.

A terminal RX1 of the DIR IC 1101 is connected to a digital input terminal 401, and terminals CMK01, BICK, LRCK, and SDTO of the DIR IC 1101 are respectively connected to terminals XTI, BCKI, LRCI, and DI of the IC 1102. With this arrangement, digital data input from the digital input terminal 401 is supplied to the IC 1102 and filter switching circuit 1106 via the DIR IC 1101. The filter switching circuit 1106 receives digital data that has undergone the filter process in the IC 1102. The digital data that has undergone the filter process in the IC 1102 undergoes a filter process in the filter switching circuit 1106 at a cutoff frequency corresponding to the reproduction frequency component of the digital data, and is output to the IC 1103. Furthermore, after a D/A conversion process in the IC 1103, an analog signal from which RF noise has been removed by the analog LPF 1105, is output from an analog output terminal 411.

Figure 11B:
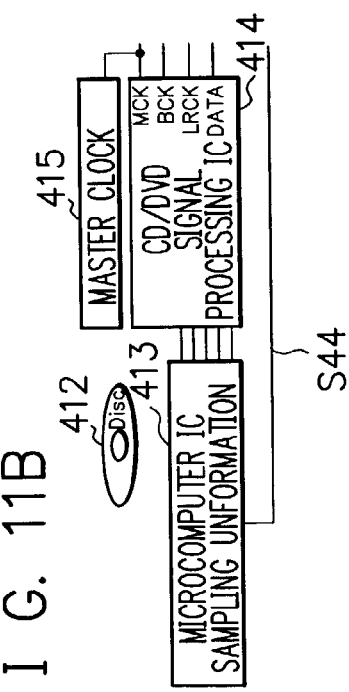

Note that a signal processing IC shown in FIG. 11B may be used in place of the DIR IC 1101 shown in FIG. 11A, as in the first embodiment. Since FIG. 11B is the same as FIG. 4B, a description thereof will be omitted.

As described above, according to the second embodiment, the reproduction frequency determination circuit 502 and cutoff frequency selection circuit 503 detect the frequency level of a reproduced signal that pertains to input digital data, and select an appropriate cutoff frequency in the digital LPF 504 on the basis of the detection result. Furthermore, the digital LPF 504 executes the filter process of the digital data at the selected cutoff frequency, and removes RF noise as out-of-band noise components.

In this manner, the cutoff frequency in the digital LPF 504 can be appropriately switched in accordance with the frequency level of the reproduced signal obtained by reproducing digital data, and unnecessary out-of-band noise components can be appropriately removed from an analog audio signal obtained by demodulating the digital data.

In the second embodiment, since the filter process according to the frequency level of the reproduced signal is implemented by a digital process, i.e., executed for data before being processed by the D/A conversion IC 103, unnecessary out-of-band noise components generated by the D/A conversion IC 103 cannot be removed, but the precision in the digital region can be improved and quantization noise can be reduced. For example, when digital data associated with a 16-bit, 1-kHz sine wave signal with a sampling frequency of 44.1 kHz is processed by setting the cutoff frequency of the digital LPF, which has 24-bit resolution, to be 2 kHz in the signal processing apparatus of the second embodiment, quantization noise of the digital data is converted into digital data with higher precision by the process of the digital LPF in the time axis direction, and according to an increase in the number of bits in the resolution direction, and can be reduced to be smaller than the source signal. In this way, distortion components of an analog signal after the D/A conversion process can be reduced.

Third Embodiment

The third embodiment will be described below.

FIG. 12 is a block diagram showing an example of the arrangement of a digital audio instrument to which a signal processing apparatus according to the third embodiment of the present invention is applied. Note that the same reference numerals in FIG. 12 denote blocks having the same functions as those shown in FIGS. 1 and 5, and a repetitive description thereof will be omitted.

Referring to FIG. 12, reference numeral 1201 denotes a filter unit, which comprises the reproduction frequency determination circuit 502, cutoff frequency selection circuit 503, analog LPF 105, and delay circuit 505. This filter unit 1201 is obtained by modifying the circuit, which executes a filter process for digital data upon selecting the cutoff frequency according to the frequency component of a reproduced signal and executing the filter process in the second embodiment described above, to a circuit which executes a filter process for an analog signal after the D/A conversion process of the D/A conversion IC 103. Note that the operations of the respective functional blocks are the same as those in the first and second embodiments, and a description of the operation in the third embodiment will be omitted. Also, as in the first and second embodiments described above, the analog LPF 105 is not limited to a low-pass filter, but may use an analog bandpass filter.

Figure 13A:
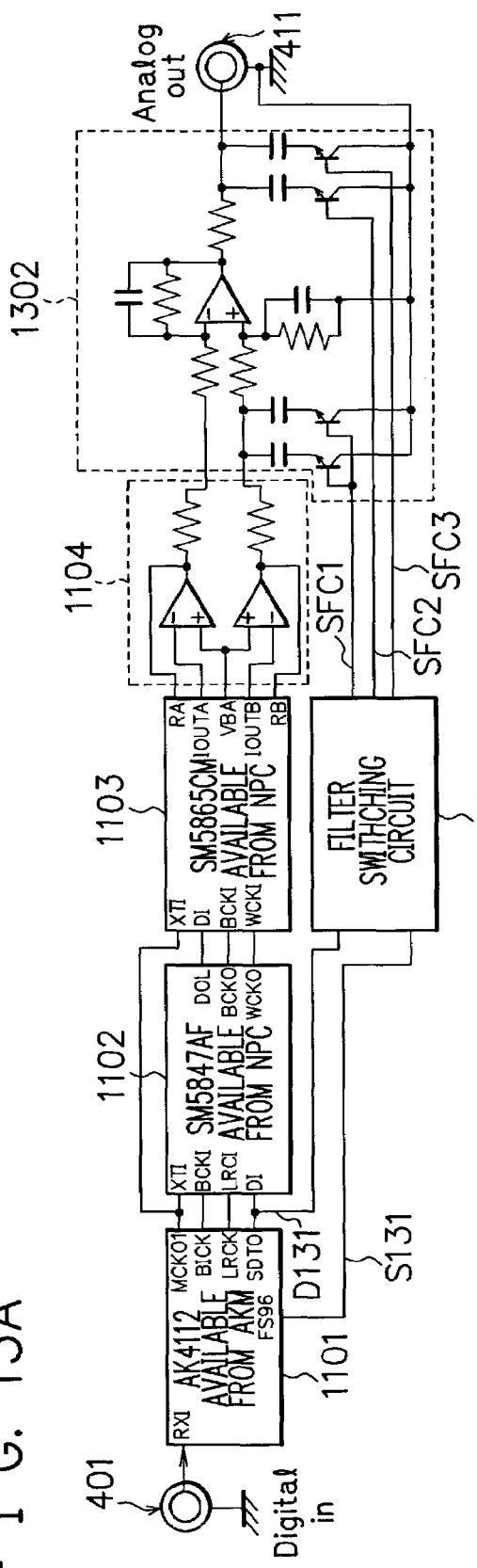
FIGS. 13A and 13B are circuit diagrams showing examples of practical arrangements of digital audio instruments to which the signal processing apparatus according to the third embodiment is applied.

FIG. 13A shows an example of a practical arrangement of a digital audio instrument to which the signal processing apparatus according to the third embodiment of the present invention is applied. Note that the same reference numerals in FIG. 13A denote blocks having the same functions as those shown in FIGS. 4A and 11A, and a repetitive description thereof will be omitted.

Referring to FIG. 13A, reference numeral 1301 denotes a filter switching control circuit, which corresponds to the filter unit 1201 (except for the analog LPF 105) shown in FIG. 12. Reference numeral 1302 denotes an analog LPF, the cutoff frequency of which can be switched to one of 5, 12, 35, and 80 kHz. The cutoff frequency of the analog LPF 1302 is switched by signals SFC1 to SFC3 output from the filter switching control circuit 1301, and can be switched depending on whether or not capacitors arranged in the analog LPF 1302 are connected to the ground.

Figure 13B:
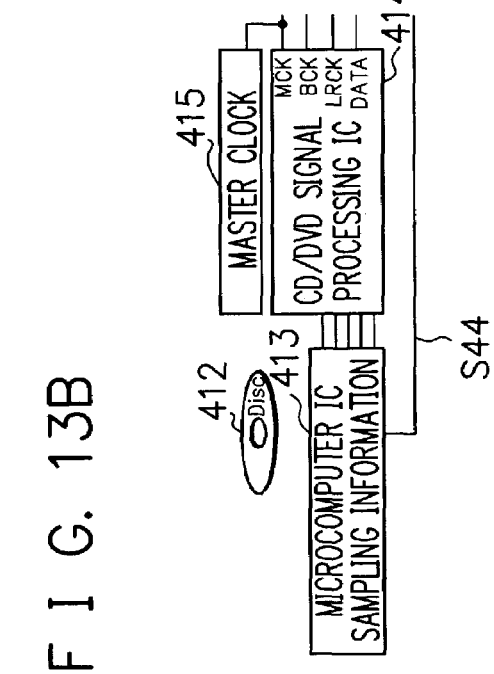

Note that a signal processing IC shown in FIG. 13B may be used in place of the DIR IC 1101 shown in FIG. 13A, as in the first embodiment. Since FIG. 13B is the same as FIG. 4B, a description thereof will be omitted.

As described above, according to the second embodiment, the reproduction frequency determination circuit 502 and cutoff frequency selection circuit 503 detect the frequency level of a reproduced signal that pertains to input digital data, and select and determine an appropriate cutoff frequency in the analog LPF 105 on the basis of the detection result. Furthermore, the analog LPF 105 selects a filter of the selected and determined cutoff frequency, and removes RF noise as out-of-band noise components from an analog audio signal obtained by the D/A conversion process of the D/A conversion IC 103.

In this manner, the cutoff frequency in the analog LPF 105 can be appropriately switched in accordance with the frequency level of a reproduced signal obtained by reproducing digital data, and unnecessary out-of-band noise components can be appropriately removed from an analog audio signal obtained by demodulating the digital data, thus improving the S/N ratio and THD+N characteristics.

When the signal processing apparatus of the third embodiment uses a low-pass filter (or bandpass filter) having a cutoff frequency of 2 kHz as the analog LPF 105, and processes digital data that pertains to a 1-kHz sine wave signal, even when distortion components of third or higher orders (3, 4, 5, . . . kHz) are generated in the D/A conversion IC 103, such distortion components can be removed, and an analog signal can be reproduced and output beyond the performance of the D/A conversion IC 103. Likewise, according to the third embodiment, for example, even when the D/A conversion IC 103 has poor precision and generates differential/integral nonlinear errors, the influences of these errors can often be suppressed.

For example, a music signal that has undergone an MP3 compression process in a personal computer or the like becomes that within a frequency band of 10 kHz or less even when it is decoded as a signal for digital audio. Hence, the S/N ratio can be improved by removing components of 12 kHz or higher from that music signal by the analog LPF 105. Also, a problem that noise components of several ten kHz are always generated, as one of drawbacks of a D/A conversion IC based on $\Delta\Sigma 1$ bit, which is most popularly used in existing digital audio instruments, can be solved.

Note that the above embodiments are merely examples upon practicing the present invention, and the technical scope of the present invention must not be limitedly interpreted by these embodiments. That is, the present invention can be practiced in various forms without departing from its technical idea or principal features.

As described above, according to the present invention, since a detection circuit detects the frequency level of a reproduced signal obtained by processing digital data, and the cutoff frequency of a filter that executes a filter process of a signal based on the digital data is controlled to be changed in accordance with the detected frequency level of the reproduced signal, unnecessary out-of-band noise components can be removed from a reproduced signal obtained by demodulating the digital data using the filter with an appropriate cutoff frequency corresponding to the frequency level of the reproduced signal upon outputting the reproduced signal.

Also, when the detection circuit detects the sampling frequency of digital data from input data, and the cutoff frequency of a filter that executes a filter process of an analog reproduced signal obtained by demodulating the digital data is controlled to be changed, unnecessary out-of-band noise components can be removed from the analog reproduced signal using the filter with an appropriate cutoff frequency corresponding to the sampling frequency of the digital data upon outputting the analog reproduced signal.

What is claimed is:

1. A signal processing apparatus comprising;
   a detection circuit for detecting a sampling frequency of a reproduced signal obtained by executing a signal process on an input digital data, said detection circuit extracting a plurality of digital data bits at constant time intervals, which make up the reproduced signal, and detecting the sampling frequency of the reproduced signal on the basis of increases/decreases in value of the neighboring extracted digital data bits;
   a D/A conversion circuit for converting the digital data into an analog reproduced signal; and
   an analog filter circuit, a cutoff frequency of which is controlled to be changed in accordance with the sampling frequency, for executing a filter process on the analog reproduced signal converted by said D/A conversion circuit at a cutoff frequency corresponding to the sampling frequency of the reproduced signal detected by said detection circuit.

2. The apparatus according to claim 1, wherein said analog filter circuit removes frequency components higher than that of the reproduced signal from the analog reproduced signal in accordance with the sampling frequency of the reproduced signal detected by said detection circuit.

3. The apparatus according to claim 1, further comprising a cutoff frequency selection circuit for selecting a cutoff frequency in the filter process in accordance with the sampling frequency of the reproduced signal detected by said detection circuit.

4. The apparatus according to claim 3, wherein said cutoff frequency selection circuit selects the cutoff frequency in the filter process by comparing setup values of cutoff frequencies of a filter, which are set in advance, and the sampling frequency of the reproduced signal detected by said detection circuit.

5. The apparatus according to claim 1, wherein said analog filter circuit comprises a plurality of analog filters having different cutoff frequencies or an analog filter having a variable cutoff frequency, and selectively switches a cutoff frequency used in the filter process in accordance with the sampling frequency of the reproduced signal detected by said detection circuit by either selecting an analog filter used in the filter process from among the plurality of analog filters or selecting a cutoff frequency of the analog filter having the variable cutoff frequency used in the filter process.

6. The apparatus according to claim 5, wherein each of the plurality of analog filters having the different cutoff frequencies comprises one resistor, a capacitor, and an operational amplifier, wherein a capacitance of the capacitor is different for each of the plurality of analog filters.

7. The apparatus according to claim 5, wherein the analog filter, the cutoff frequency of which is changed, comprises one resistor, an operational amplifier, and a plurality of capacitors, and the cutoff frequency is changed depending on whether or not the capacitors are connected to the ground.

8. The apparatus according to claim 5, wherein the analog filter used in the filter process is a low-pass filter.

9. The apparatus according to claim 5, wherein the analog filter used in the filter process is a bandpass filter.

10. A signal processing apparatus comprising:
an interface circuit for inputting a digital data;
a detection circuit for detecting a sampling frequency of a reproduced signal, obtained by processing the digital data, from the digital data input via said interface circuit, said detection circuit extracting a plurality of digital data bits at constant time intervals, which make up the reproduced signal, and detecting the sampling frequency of the reproduced signal on the basis of increases/decreases in value of the neighboring extracted digital data bits;
a cutoff frequency selection circuit for selecting a cutoff frequency used in executing a filter process on the digital data in accordance with the sampling frequency of the reproduced signal detected by said detection circuit;
a digital filter circuit for removing high-frequency noise of the digital data input via said interface circuit;
a D/A conversion circuit for converting the digital data from which the high-frequency noise has been removed by said digital filter circuit into an analog reproduced signal; and
an analog filter circuit, having a plurality of analog filters which have different cutoff frequencies which is controlled to be changed in accordance with the sampling frequency, and executing a filter process on the analog reproduced signal converted by said D/A conversion circuit at the cutoff frequency selected by said cutoff frequency selection circuit.

11. The apparatus according to claim 10, further comprising a delay circuit for delaying the digital data output from said interface circuit, and supplying the delayed digital data to said digital filter circuit.

12. A signal processing apparatus comprising:
a detection circuit for detecting a sampling frequency of an input digital data, said detection circuit extracting a plurality of digital data bits at constant time intervals, which make up the digital data, and detecting the sampling frequency of the digital data on the basis of increases/decreases in value of the neighboring extracted digital data bits;
a D/A conversion circuit for converting the digital data into an analog reproduced signal; and
an analog filter circuit having a filter, a cutoff frequency of which is controlled to be changed, and executing a filter process on the analog reproduced signal converted by said D/A conversion circuit at a cutoff frequency corresponding to the sampling frequency detected by said detection circuit.

13. The apparatus according to claim 12, wherein said analog filter circuit removes frequency components, higher than a half frequency of the sampling frequency detected by said detection circuit, from the analog reproduced signal.

14. The apparatus according to claim 12, wherein said analog filter circuit has a plurality of analog filters having different cutoff frequencies, and selectively switches the analog filter used in the filter process in accordance with the sampling frequency detected by said detection circuit.

15. The apparatus according to claim 14, wherein the analog filter is a low-pass filter.

16. A signal processing apparatus comprising:
an interface circuit having a function of detecting a sampling frequency of an input digital data, and inputting the digital data, said interface circuit extracting a plurality of digital data bits at constant time intervals, which make up the digital data, and detecting the sampling frequency of the digital data on the basis of increases/decreases in value of the neighboring extracted digital data bits;
a digital filter circuit for removing high-frequency noise of the digital data input via said interface circuit;
a D/A conversion circuit for converting the digital data, from which the high-frequency noise has been removed by said digital filter circuit, into an analog reproduced signal; and
an analog filter circuit having a plurality of analog filters which have different cutoff frequencies, selectively switching the analog filter in accordance with the sampling frequency detected by said interface circuit, and executing a filter process on the analog reproduced signal converted by said D/A conversion circuit.

17. A signal processing method comprising the steps of:
detecting a sampling frequency of an input digital data by extracting a plurality of digital data bits at constant time intervals, which make up the digital data, and detecting the sampling frequency of the digital data on the basis of increases/decreases in value of the neighboring extracted digital data bits;
changing a cutoff frequency of an analog filter in accordance with the detected sampling frequency; and
executing a filter process using said analog filter on an analog reproduced signal obtained by converting the digital data at a cutoff frequency corresponding to the sampling frequency of the input digital data detected in the detecting step.

* * * * *